(12) United States Patent
Henning

(10) Patent No.: US 11,473,636 B2
(45) Date of Patent: Oct. 18, 2022

(54) DISC BRAKE HAVING AN ELECTROMECHANICAL ACTUATOR, IN PARTICULAR AN ELECTROMECHANICAL PARKING BRAKE ACTUATOR

(71) Applicant: WABCO Europe BVBA, Brussels (BE)

(72) Inventor: Paul Henning, Schwetzingen (DE)

(73) Assignee: WABCO Europe BVBA, Brussels (BE)

( * ) Notice: Subject to any disclaimer, the term of this patent is extended or adjusted under 35 U.S.C. 154(b) by 126 days.

(21) Appl. No.: 17/064,256

(22) Filed: Oct. 6, 2020

(65) Prior Publication Data
US 2021/0164529 A1      Jun. 3, 2021

(30) Foreign Application Priority Data
Oct. 7, 2019   (EP) ..................................... 19201708

(51) Int. Cl.
| | | |
|---|---|---|
| *F16D 65/18* | (2006.01) | |
| *B60T 13/74* | (2006.01) | |
| *F16D 55/226* | (2006.01) | |
| *F16D 121/14* | (2012.01) | |
| *F16D 121/24* | (2012.01) | |
| *F16D 127/06* | (2012.01) | |
| *F16D 129/08* | (2012.01) | |
| *F16D 125/28* | (2012.01) | |

(52) U.S. Cl.
CPC ............ *F16D 65/18* (2013.01); *B60T 13/741* (2013.01); *F16D 55/226* (2013.01); *F16D 2121/14* (2013.01); *F16D 2121/24* (2013.01); *F16D 2125/28* (2013.01); *F16D 2127/06* (2013.01); *F16D 2129/08* (2013.01)

(58) Field of Classification Search
CPC .... F16D 65/18; F16D 55/226; F16D 2121/24; F16D 2127/06; F16D 2129/08; F16D 2125/28; F16D 2125/30; F16D 2125/32; F16D 2125/50; B60T 13/741
See application file for complete search history.

(56) References Cited

U.S. PATENT DOCUMENTS

| | | | | |
|---|---|---|---|---|
| 4,175,645 | A * | 11/1979 | Brinkert ................... | B61H 5/00 188/71.9 |
| 6,471,017 | B1 * | 10/2002 | Booz ........................ | F16D 55/02 188/162 |

(Continued)

FOREIGN PATENT DOCUMENTS

| | | |
|---|---|---|
| CN | 107289044 A | 10/2017 |
| DE | 19650405 A1 | 6/1998 |

(Continued)

*Primary Examiner* — Nicholas J Lane
(74) *Attorney, Agent, or Firm* — Dickinson Wright PLLC

(57) ABSTRACT

A disc brake (1) includes an electromechanical actuator (2), in particular an electromechanical parking brake actuator. The electromechanical actuator (2) includes a driveshaft (6), an electric motor (7) arranged on the driveshaft (6), a cam disc (5) arranged on an output shaft (49), and a transmission (8) arranged on the driveshaft (6) configured for transmitting the torque of the electric motor (7) to a force-transmission device (3). A magnetic brake (20) is disposed on the driveshaft (6) between the electric motor (7) and the cam disc (5) for arresting the driveshaft (6).

19 Claims, 5 Drawing Sheets

(56) References Cited

U.S. PATENT DOCUMENTS

| | | | |
|---|---|---|---|
| 2007/0062769 A1* | 3/2007 | Noh | B60T 13/588 |
| | | | 188/162 |
| 2014/0188361 A1* | 7/2014 | Hyun | B60T 8/885 |
| | | | 188/72.8 |
| 2018/0001878 A1 | 1/2018 | Thomas | |
| 2018/0038428 A1* | 2/2018 | Severinsson | F16D 65/18 |
| 2020/0062230 A1* | 2/2020 | Henning | F16D 65/183 |

FOREIGN PATENT DOCUMENTS

| | | |
|---|---|---|
| DE | 19752543 A1 | 6/1999 |
| DE | 19955080 A1 | 5/2001 |
| DE | 102011086152 A1 | 2/2013 |
| EP | 0275783 B1 | 7/1988 |
| WO | 03071150 A1 | 8/2003 |

* cited by examiner

DISC BRAKE HAVING AN ELECTROMECHANICAL ACTUATOR, IN PARTICULAR AN ELECTROMECHANICAL PARKING BRAKE ACTUATOR

FIELD

The invention relates to a disc brake having an electromechanical actuator for vehicles, in particular for utility vehicles.

BACKGROUND

Electromechanical actuators for activating brake devices are generally known. As a rule, electromechanical actuators comprise an electric motor for generating a drive torque, a transmission device, in particular a transmission device having a cam disc for converting the drive torque, that is to say a rotational movement, into a translational movement for an actuating unit. The actuating unit applies a brake force via two brake linings during a braking process. In order to arrest a vehicle, the electromechanical actuators have a parking lock mechanism. Inter alia, brakes are present for arresting the electromechanical actuator. Generally switchable brakes are known in the field of automotive engineering. A switchable brake is understood to be a brake which can connect and disconnect a force flow between an output-side shaft and a driven shaft.

A brake which is configured as a parking brake mechanism is known, for example, from DE19955080A1. Brakes which are embodied as a parking brake mechanism are also known colloquially as a brake. The brake is connected directly to the electric motor. The brake and the electric motor are installed together in a housing. A screw drive is arrested by way of a driveshaft which is arranged horizontally with respect to a brake lining and which converts the rotational movement of the electric motor into a translational movement. The brake operates with a spreading device which causes the brake to open in accordance with the rotational direction.

A further arrangement of a brake in an electromechanical actuator is shown by EP0275783B1. The brake arrests a ball screw drive which applies the brake disc via brake linings.

In DE19650405A1, a ball screw drive is also arrested horizontally with respect to the brake linings with a brake, in order to implement the parking brake mechanism. However, in contrast with EP0275783B1 the brake is configured as a positively locking brake with teeth.

DE19752543A1 generally describes a magnetic brake for an electromechanical actuator, wherein the rotational movement of the electric motor is secured directly by way of the magnetic brake and a movable pin. The pin acts here at a 90° angle with respect to the shaft of the electric motor.

SUMMARY

The object of the invention is to improve on the prior art mentioned in the application and to provide a disc brake with an electromagnetic actuator, in particular an electromagnetic parking brake actuator, which is of compact design and cost-effective and has an emergency release which is easy to operate.

The object is achieved in that the brake disc has an electromechanical actuator which comprises a magnetic brake, a driveshaft, a transmission and an electric motor, and the magnetic brake is arranged in a positively locking fashion on the driveshaft, between the electric motor and a driveshaft output of the driveshaft. In order to implement a parking brake function with the electromechanical actuator in a parked vehicle which is switched to a currentless state, positive locking or frictional locking is implemented via the magnetic brake. The magnetic brake is, in one aspect, arranged at a point in the torque flow/force flow of the electromechanical actuator, that is to say in a frictionally locking fashion on the output shaft between the electric motor and the driveshaft output, where the torque that is to be transmitted by the magnetic brake is lowest, in order to keep the components of the magnetic brake as small and cost-effective as possible. The torque shall be understood as being the torque that is transmitted from a transmission, which may be embodied as a reduction gearbox connected to the electric motor.

In one aspect, the torque to be transmitted by the magnetic brake, on the driveshaft, is lowest between the electric motor and the cam disc. During a parking brake function, the magnetic brake arrests the cam disc via the driveshaft and the transmission. The torques which are to be blocked are lowest at the electric motor. The electric motor preferably has a torque of approximately 10 Nm, which is preferably converted with a ratio of 1:25 by the transmission, so that, in the case of an electromechanical parking brake actuator, the electric motor generates a torque up to 250 Nm at the cam disc. It is therefore easier to generate an axial force for blocking via the compression spring for 10 Nm at the electric motor than it is to generate an axial force for blocking the compression spring for 250 Nm at the input of the electric motor.

In a further aspect, the magnetic brake is arranged on a transmission input, axially on the opposite side of the electric motor, which provides advantages in terms of installation space and allows the electromechanical actuator to be constructed in a compact fashion overall.

In a further aspect, the magnetic brake is embodied as a frictionally locking friction brake. A friction brake which is embodied as a magnetic brake, also referred to as a slip brake, shall be understood here as a brake that prevents a rotational movement of the driveshaft. The drive side is provided with an electromagnet or a solenoid. In the magnetic field generated by the electromagnets or the solenoid, the armature shifts in the axial direction, due to the magnetic force or spring force. The armature is excited by way of an air gap that is arranged between the electromagnet or the solenoid and the movable armature. The parking brake function of the electromechanical actuator is generated when the solenoid is without voltage. The compression springs then press the armature against the friction disc and further against the magnetic brake housing. This produces a force flow that prevents rotation of the motor shaft. When the voltage is applied, the magnetic force acts on the armature and pulls the armature counter to the force of the compression springs. Therefore, the gap between the magnetic brake housing, the friction brake, and the armature is increased again and the driveshaft can rotate freely.

In a further advantageous aspect, the magnetic brake that is embodied as a frictionally locking friction brake has a friction disc with friction linings that are arranged opposite one another on each side of the friction disc, and the friction disc is arranged on the driveshaft, in an electric motor or in a magnetic brake housing. The friction disc is connected in a positively locking fashion to the driveshaft ahead of the transmission input. In order to keep the moments of mass inertia as small as possible and in order not to limit the dynamics of the electric motor, the friction linings of the magnetic brake are arranged in the electric motor housing or in the magnetic brake housing, in order to support the reactive torque, also known as the reaction torque, in the electric motor housing or in the magnetic brake housing.

In a further aspect, for mechanically releasing the brake linings from the brake disc, the driveshaft has a receptacle for a tool. The receptacle is part of the driveshaft. That is to say the receptacle is manufactured with the driveshaft in the same working steps. However, the receptacle can also be embodied as an independent component which is arranged on the driveshaft output. The receptacle is designed to mechanically release the brake linings from the brake disc, in particular to mechanically release the brake linings in the event of a defect.

In a further aspect, the receptacle is a hexagon. A hexagon is a generally customary shape for wrenches, so that in case of a defect of the electromechanical actuator, multiple operators can release the electromechanical actuator mechanically. That is to say in the case of a defect the driveshaft can be rotated with a tool on the hexagon. The magnetic brake is configured in terms of its closing force or its maximum arresting torque in such a way that the friction linings, also referred to as friction pairing, slip as soon as the operator exceeds the arresting torque during a rotation of the tool.

In a further aspect, the magnetic brake has a bearing for receiving a bearing point of the driveshaft. To be more precise, the bearing point is arranged on the magnetic brake housing of the magnetic brake so that there is a saving in terms of installation space in the actuator housing or installation space in a housing for receiving the electric motor for a separate bearing point.

It has also proven advantageous that the driveshaft, the electric motor, the magnetic brake, and the transmission are arranged in the electromagnetic actuator in a direction perpendicular to actuation direction of the brake linings and generally parallel to a longitudinal direction of the brake linings, which may be referred to as a horizontal direction. The electromechanical actuator is also oriented horizontal and perpendicular with respect to the axial axis of the disc brake. The horizontal arrangement of the electromechanical actuator and the horizontal arrangement of the specified components in the electromechanical actuator act advantageously on environmental vibrations or vibrations which are triggered by the electric motor itself. In particular, the bearing means of the electric motor, of the driveshaft, of the magnet brake and of the transmission are loaded to a lesser degree by relatively minor vibrations, which increases the service life of the bearings. Insofar as a horizontally arranged electromechanical actuator cannot be used in a vehicle for reasons of installation space, a vertical arrangement of the electromechanical actuator with respect to the axial axis of the disc brake and a vertical arrangement of the driveshaft, of the electric motor, of the magnetic brake and of the transmission with respect to the brake linings are also conceivable. In one development, the magnetic brake which is embodied as a frictionally locking friction brake additionally has, in the magnetic brake housing in a horizontal direction with respect to the axial housing of the disc brake, a solenoid, a movable armature, a friction disc arranged between the friction linings, and compression springs for applying the friction linings against the friction disc. The magnetic brake is coupled to the driveshaft, wherein the driveshaft is guided horizontally through the magnetic brake.

In another embodiment, the magnetic brake is designed to secure the cam disc in a way which is independent of the direction of rotation, with respect to the electric motor. Brakes which are independent of the direction of rotation can move counter to a brake which is dependent on the direction of rotation, in the clockwise direction or in the counterclockwise direction.

BRIEF DESCRIPTION OF THE DRAWINGS

Selected exemplary embodiments of the invention are explained below with reference to the appended figures, in which.

DETAILED DESCRIPTION OF THE DRAWINGS

Figure 1:
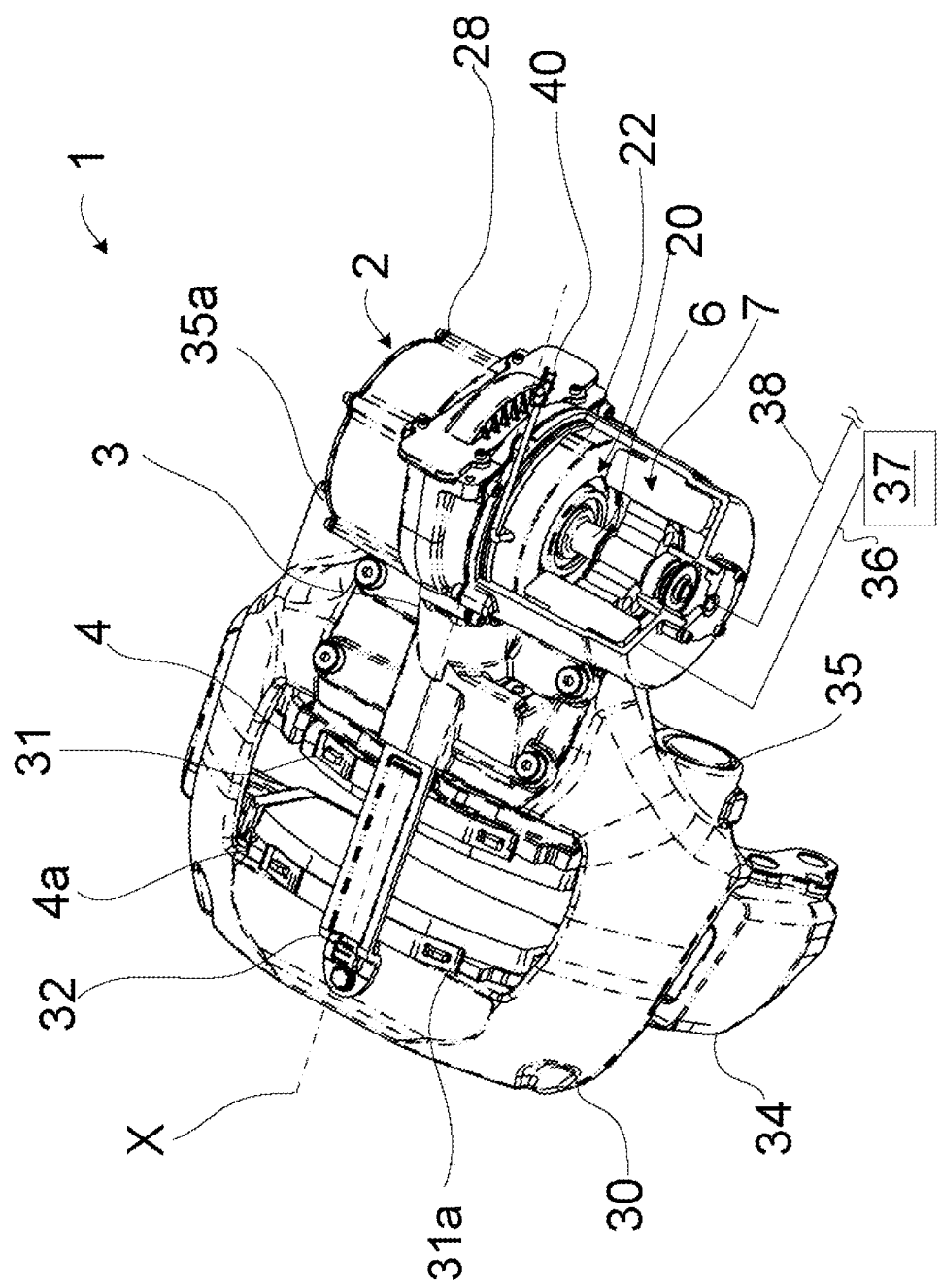
FIG. 1 shows a disc brake with an electromechanical actuator in an overhead perspective view.

FIG. 1 illustrates a disc brake 1 with an electromechanical actuator 2 which is connected by a flange to the disc brake 1. The electromechanical actuator 2 is arranged on a brake caliper 30, above a force transmission device 3, which is arranged within the electro-mechanical actuator and has the purpose of applying a brake force to a brake disc (not shown) which is arranged between two brake linings 4, 4a. The brake linings 4, 4a are each held radially in position by way of a retainer spring 31, 31a and a lining securing strap 32, to prevent them from dropping out of a brake carrier 34. The brake caliper 30 is also mounted in a sliding fashion along an axial axis X by way of two guide bolts 35, 35a. The electromechanical actuator 2 is connected by a flange horizontally with respect to the axial axis X, on the brake caliper 30. A multi-phase power cable 36 that is connected by a flange to the actuator housing 28 transmits, from a control unit 37 to the electromechanical actuator 2, control signals for activating the electromechanical actuator 2. Additionally, the multi-phase power cable 36 makes available an input voltage for an electric motor 7 that is arranged in the electromechanical actuator 2. The voltage supply of the magnetic brake 20 is made available by way of a magnetic brake connection 40. The voltage supply and the transmission of signals of the incremental sensor (not illustrated), also known as a position sensor or rotational angle sensor, are provided via a signal cable 38.

Figure 2:
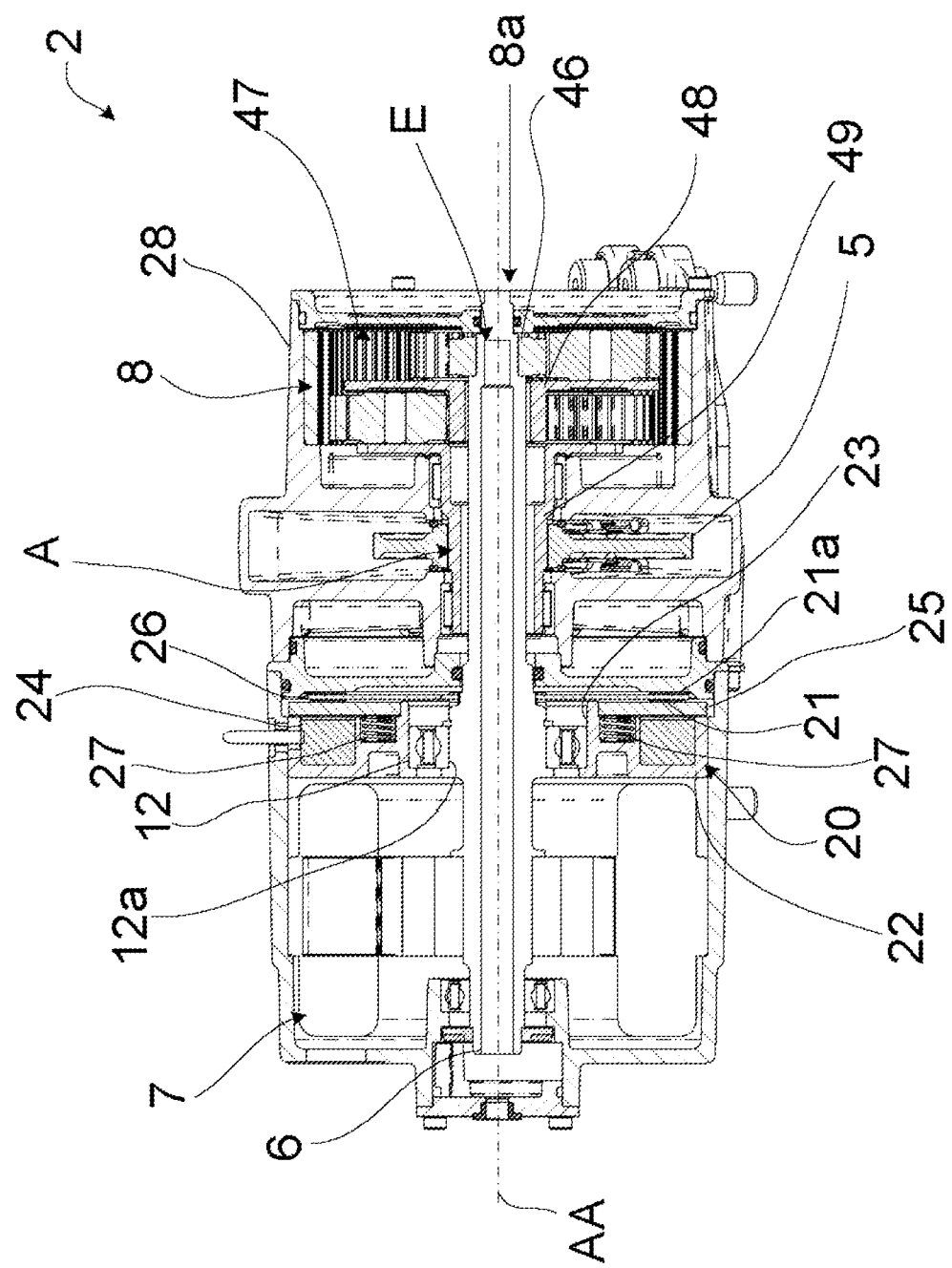
FIG. 2 shows a sectional side view of the electromechanical actuator according to FIG. 1.

In addition, a horizontally arranged driveshaft 6, a transmission 8 and a cam disc 5 are arranged in the actuator housing 28 (illustrated in more detail in FIG. 2). Reference to horizontal in this instance refers to the arrangement and orientation illustrated in FIG. 2.

FIG. 2 shows the electromechanical actuator 2 according to FIG. 1 in detail. The electric motor 7 is arranged along an axial axis AA of the electromechanical actuator 2 on the driveshaft 6, on the opposite side from the transmission 8, and generates a rotational movement which is transmitted by the transmission 8. The driveshaft 6 is operatively connected to the transmission 8 via a sun gear 46 of the transmission 8. The connection of the driveshaft 6 to the sun gear 46 of the transmission 8 is also referred to as a driveshaft input E. Gearwheels 47, which are embodied as planetary gears 47, transmit the rotational movement of the electric motor 7 to a web 48 of the transmission 8, which is in turn coupled to a hollow shaft 49. The hollow shaft 49 transmits the rotational movement of the electric motor 7, transmitted by the transmission 8, to the cam disc 5. The hollow shaft 49 is also referred to as driveshaft output A.

The cam disc 5 converts the rotational movement of the electric motor 7 into a translatory movement, that is to say into an axial linear movement. The magnetic brake 20 is arranged in a positively locking fashion on the driveshaft 6, axially and operatively (in a force-flow direction) between the electric motor 7 and the cam disc 5. A hexagon 10, embodied as a receptacle 10, is arranged horizontally on the driveshaft output A on the driveshaft 6. The hexagon 10 permits the driveshaft 6 to be driven mechanically counter to the rotational direction of the electric motor 7 for opening of the brake linings 4, 4a (see FIG. 1) by the brake disc. The magnetic brake 20 comprises, inter alia, a magnetic brake housing 22. A bearing 12 for receiving a bearing point 12a of the driveshaft 6 is arranged on an inner side 23 of the magnetic brake housing 22. The magnetic brake 20 is embodied as a friction brake. That is to say the magnetic brake 20 also has two friction linings 21, 21a which are separated by a friction disc 26. The friction disc 26 is connected in a positively locking fashion to the driveshaft 6 by way of a toothed profile 39 (see FIG. 3). The friction disc 26 therefore rotates along with the driveshaft 6. On the drive side, and therefore in the direction of the electric motor 7, a solenoid 24 which does not rotate along with the driveshaft 6 is arranged in the magnetic brake 20. In other words, the solenoid 24 is arranged fixedly in the magnetic brake housing 22. The solenoid 24 is energized via a magnetic brake connection 40, and depending on the voltage which is applied a magnetic field of differing strength acts on an axially or horizontally movable armature 25. The movable armature 25 is arranged in the magnetic brake housing 22, between the friction lining 21a and the solenoid 24. Then, depending on the voltage applied at the solenoid 24, the friction disc 26 is compressed or clamped in with the friction linings 21, 21a between the movable armature 25 and the magnetic brake housing 22, via compression springs 27, as a result of which the rotational movement of the electric motor 7 is arrested by way of the driveshaft 6, in that the compression springs 27 press the movable armature 25 against the friction disc 26 and the friction linings 21, 21a, against the actuator housing 28 shown in FIG. 1 and FIG. 2.

Figure 3:
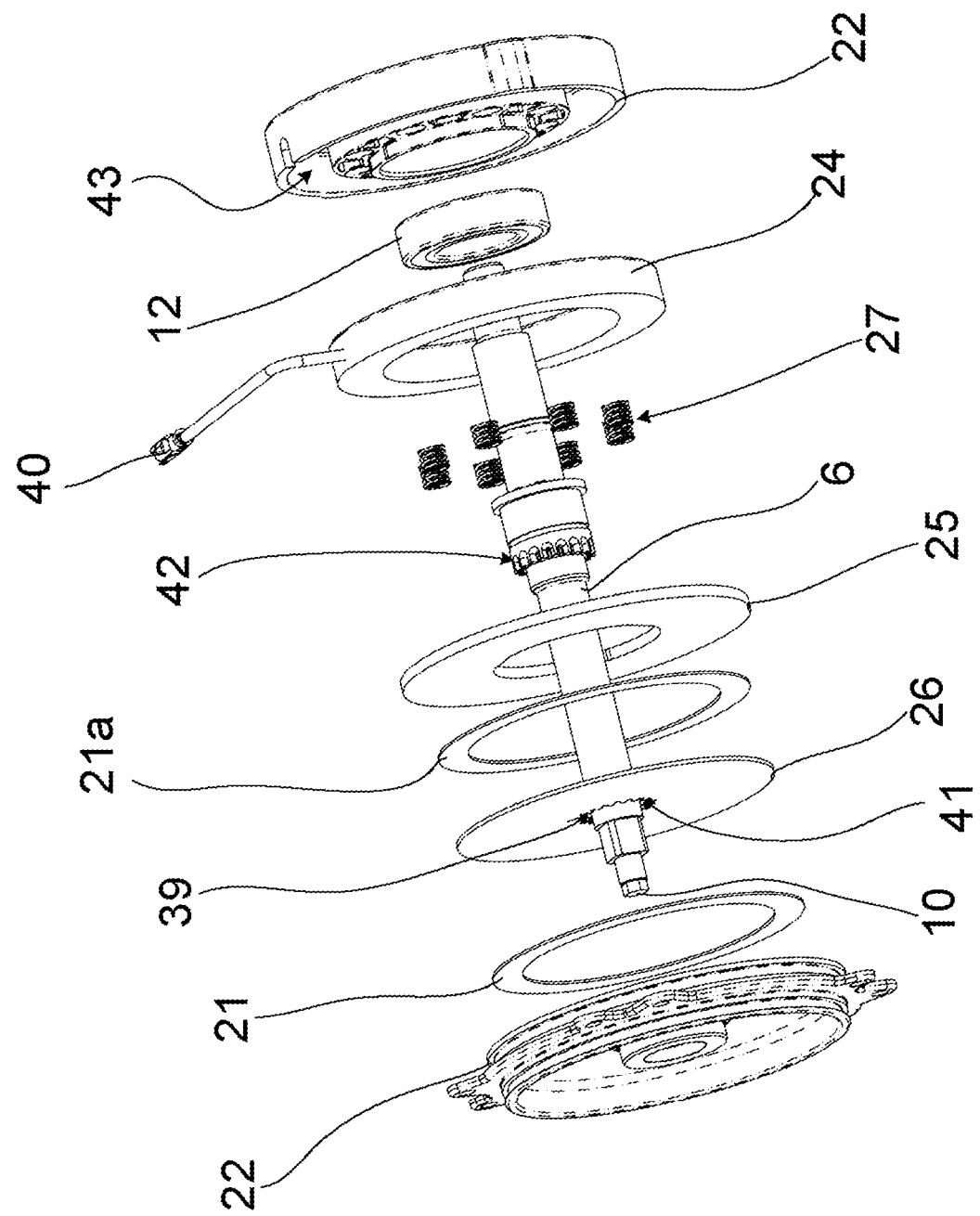
FIG. 3 shows an exploded drawing of a magnetic brake of the electromechanical actuator according to FIG. 1 and FIG. 2.

FIG. 3 shows how the magnetic brake 20 looks in detail. In particular, the friction disc 26, which is connected in a positively locking fashion to the driveshaft 6, can be seen. An opening 41 with the toothed profile 39 is arranged in the center of the friction disc 26. The opening 41 serves to receive the driveshaft 6, wherein the friction disc 26 is fitted onto a gear ring 42 that is arranged on the driveshaft 6. The solenoid 24 is arranged in a recess 43 in the magnetic brake housing 22, and the magnetic brake housing 22 receives the bearing 12 for the bearing point 12a for mounting the driveshaft 6. The magnetic brake housing 22 is mounted in the actuator housing 28 (FIG. 1, FIG. 2).

Figure 4:
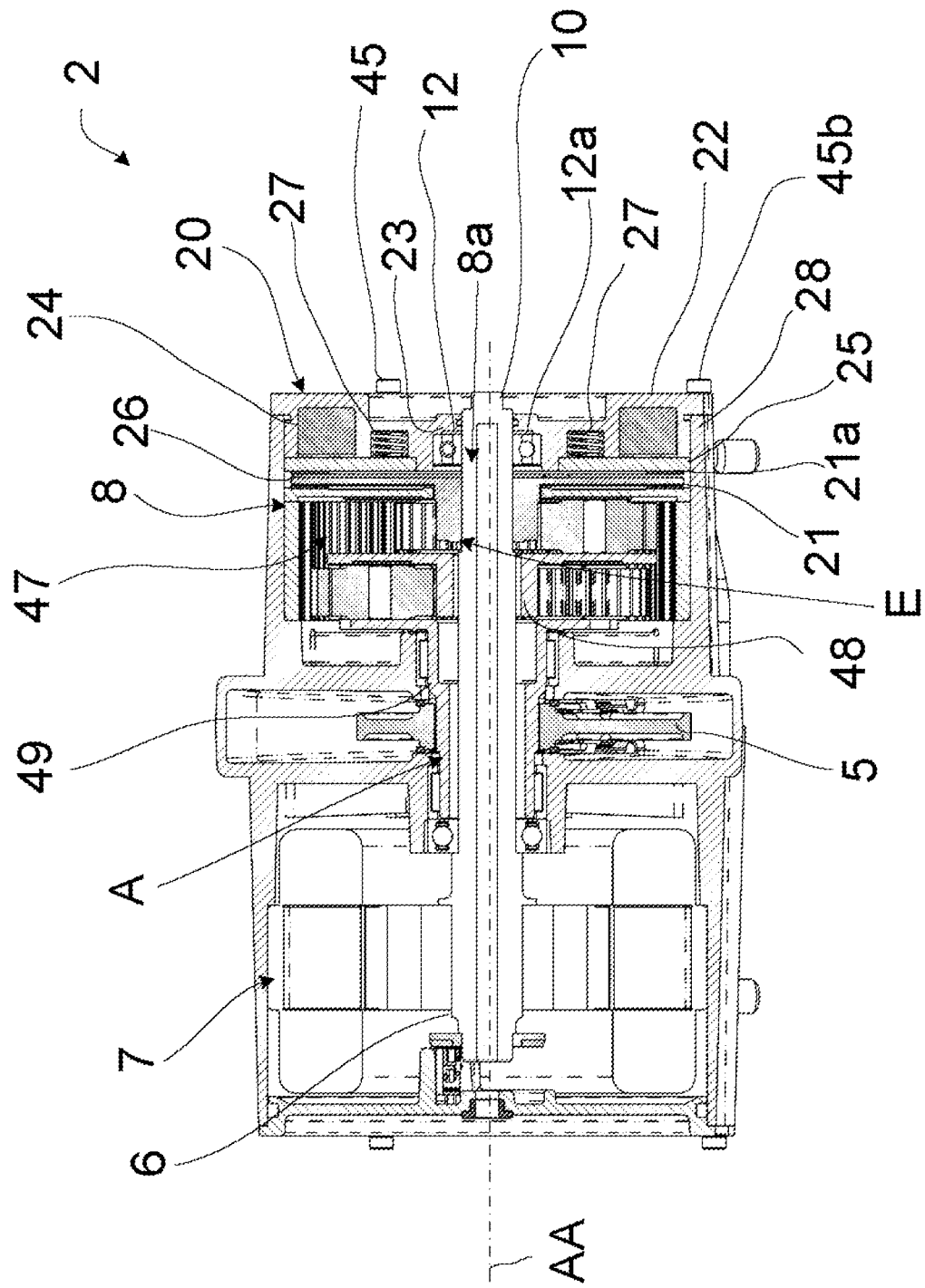
FIG. 4 shows a sectional side view of an electromechanical actuator according to an aspect of the disclosure with an alternatively arranged magnetic brake.

FIG. 4 illustrates another aspect of the electromechanical actuator 2. In contrast to FIG. 1 and FIG. 2, the magnetic brake 20 is arranged on the driveshaft 6, from the perspective of the electric motor 7, axially behind the cam disc 5 and the transmission 8. The magnetic brake 20 is shown on the right side of FIG. 4. The magnetic brake 20 is part of the actuator housing 28 in this aspect and forms a closure of the electromechanical actuator 2 on the driveshaft output A. In FIGS. 1 and 2, the magnetic brake 20 and magnetic brake housing 22 are disposed inside of the actuator housing 28.

Figure 5:
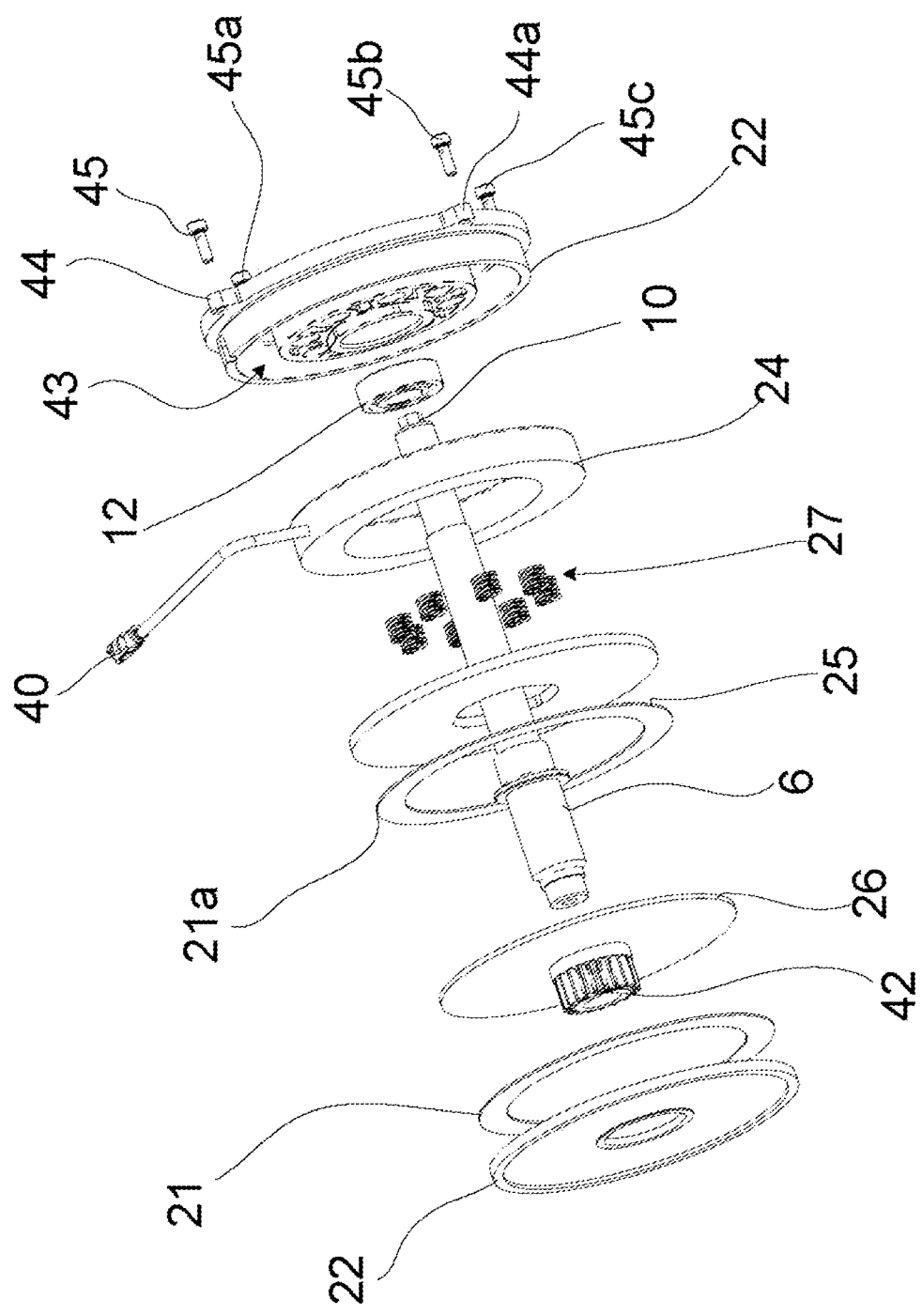
FIG. 5 shows an exploded drawing of the alternatively arranged magnetic brake of the electromechanical actuator according to FIG. 4.

FIG. 5 shows an exploded view of the alternative magnetic brake 20 arrangement according to FIG. 4 in detail. The alternative magnetic brake 20 additionally has, on the magnetic brake housing 22, drilled holes 44, 44a and connecting elements 45, 45a, 45b, 45c for connecting the magnetic brake 20 to the actuator housing 28. Furthermore, the gear ring 42 is arranged axially along the driveshaft 6, directly on the friction brake 26 in the direction of the transmission 8. The gear ring 42 is operatively connected to the transmission 8.

What is claimed is:

1. A disc brake (1) having an electromechanical actuator (2), wherein the disc brake (1) has a force-transmission device (3), the electro-mechanical actuator (2) is operatively connected to the force-transmission device (3) along an axial axis (X) of the disc brake (1), the force-transmission device (3) is configured to apply a brake force via two brake linings (4, 4a), and the electromechanical actuator (2) comprises:
    a driveshaft (6),
    an electric motor (7) arranged on the driveshaft (6),
    a cam disc (5) arranged on an output shaft (49), and
    a transmission (8) arranged on the driveshaft (6) configured for transmitting torque of the electric motor (7) to the force-transmission device (3),
wherein the electromechanical actuator (2) has a magnetic brake (20), and the magnetic brake (20) is arranged in a positively locking fashion on the driveshaft (6), in a force flow manner between the electric motor (7) and the output shaft (49);
    wherein the magnetic brake (20) is arranged in a positively locking fashion on the driveshaft (6), in a force flow manner between the electric motor (7) and the cam disc (5), and wherein the magnetic brake (20) arrests the cam disc (5) during a parking brake function via locking of the driveshaft (6).

2. The disc brake (1) as claimed in claim 1, wherein the magnetic brake (20) is arranged in a positively locking fashion on the driveshaft (6), axially on the opposite side of the driveshaft (6) from the electric motor (7), on a transmission input (8a), and wherein the magnetic brake (20) arrests the cam disc (5) during a parking brake function via locking of the driveshaft (6).

3. The disc brake (1) as claimed in claim 1, wherein the driveshaft (6) has a receptacle (10) for a tool on a driveshaft output (A) for mechanically detaching the brake linings (4, 4a) from the brake disc.

4. The disc brake (1) as claimed in claim 3, wherein the receptacle (10) is a hexagon.

5. The disc brake (1) as claimed in claim 1, wherein the magnetic brake housing (22) has a bearing (12) for receiving a bearing point (12a) of the driveshaft (6).

6. The disc brake (1) as claimed in claim 1, wherein the driveshaft (6), the electric motor (7), the magnetic brake (20), and the transmission (8) are arranged in the electromagnetic actuator (2) along an axis perpendicular to an actuation direction of the brake linings (4, 4a).

7. The disc brake (1) as claimed in claim 1, wherein the magnetic brake (20) is disposed axially between the electric motor (7) and the transmission (8).

8. The disc brake (1) as claimed in claim 1, wherein the transmission (8) is disposed axially between the electric motor (7) and the magnetic brake (20).

9. A disc brake (1) having an electromechanical actuator (2), wherein the disc brake (1) has a force-transmission device (3), the electro-mechanical actuator (2) is operatively connected to the force-transmission device (3) along an axial axis (X) of the disc brake (1), the force-transmission device (3) is configured to apply a brake force via two brake linings (4, 4a), and the electromechanical actuator (2) comprises:
- a driveshaft (6),
- an electric motor (7) arranged on the driveshaft (6),
- a cam disc (5) arranged on an output shaft (49), and
- a transmission (8) arranged on the driveshaft (6) configured for transmitting torque of the electric motor (7) to the force-transmission device (3),
  - wherein the electromechanical actuator (2) has a magnetic brake (20), and the magnetic brake (20) is arranged in a positively locking fashion on the driveshaft (6), in a force flow manner between the electric motor (7) and the output shaft (49)
  - wherein the magnetic brake (20) is a frictionally locking friction brake;
  - wherein the frictionally locking friction brake has a friction disc (26) with friction linings (21, 21a) arranged on opposite sides of the friction disc (26) in a magnetic brake housing (22).

10. The disc brake (1) as claimed in claim 9, and wherein the friction disc (26) is arranged on the driveshaft (6).

11. The disc brake (1) as claimed in claim 9, wherein the frictionally locking friction brake further includes, in the magnetic brake housing (22), a magnetic coil (24), a movable armature (25), and compression springs (27) for clamping the friction linings (21, 21a) against the friction disc (26) via movement of the armature (25).

12. The disc brake (1) as claimed in claim 5, wherein the frictionally locking friction brake further includes, in the magnetic brake housing (22), a magnetic coil (24), a movable armature (25), and compression springs (27) for clamping the friction linings (21, 21a) against the friction disc (26) via movement of the armature (25).

13. The disc brake (1) as claimed in claim 5, wherein the magnetic brake housing (22) is disposed inside the actuator housing (28).

14. The disc brake (1) as claimed in claim 5, wherein the magnetic brake housing (22) is disposed at an end of the actuator housing (28) and closes the actuator housing (28).

15. The disc brake (1) as claimed in claim 12, wherein the armature (25) axially shifts against a biasing force of the compression springs (27) when voltage is applied to the magnetic brake (20).

16. The disc brake (1) as claimed in claim 15, wherein the armature (25) axially shifts towards the friction linings (21, 21a) when the magnetic brake (20) is without voltage.

17. The disc brake (1) as claimed in claim 12, wherein a parking brake function of the electromechanical actuator is generated when the magnetic brake (20) is without voltage, wherein the compression springs press the armature (25) against the friction disc (26) and further against the magnetic brake housing (22).

18. The disc brake (1) as claimed in claim 17, wherein when voltage is applied to the magnetic brake (20), a magnetic force acts on the armature (25) and pulls the armature counter to a force of the compression springs, and a gap between the magnetic brake housing (22), the friction brake, and the armature (25) is increased and the driveshaft (6) can rotate freely.

19. A disc brake (1) having an electromechanical actuator (2), wherein the disc brake (1) has a force-transmission device (3), the electro-mechanical actuator (2) is operatively connected to the force-transmission device (3) along an axial axis (X) of the disc brake (1), the force-transmission device (3) is configured to apply a brake force via two brake linings (4, 4a), and the electromechanical actuator (2) comprises:
- a driveshaft (6),
- an electric motor (7) arranged on the driveshaft (6),
- a cam disc (5) arranged on an output shaft (49), and
- a transmission (8) arranged on the driveshaft (6) configured for transmitting torque of the electric motor (7) to the force-transmission device (3),
  - wherein the electromechanical actuator (2) has a magnetic brake (20), and the magnetic brake (20) is arranged in a positively locking fashion on the driveshaft (6), in a force flow manner between the electric motor (7) and the output shaft (49);
  - wherein the magnetic brake (20) secures the cam disc (5) independent of the direction of rotation caused by the electric motor (7).

* * * * *